United States Patent [19]

Lippman et al.

[11] 4,178,199
[45] Dec. 11, 1979

[54] NOISE REDUCTION IN PNEUMATIC TIRES

[75] Inventors: Seymour A. Lippman, Huntington Woods; Gary P. Stokes, Westland; Charles M. Chupa, Dearborn Heights, all of Mich.

[73] Assignee: Uniroyal, Inc., New York, N.Y.

[21] Appl. No.: 937,366

[22] Filed: Aug. 28, 1978

Related U.S. Application Data

[63] Continuation of Ser. No. 839,235, Oct. 4, 1977, abandoned, which is a continuation of Ser. No. 673,313, Apr. 5, 1976, abandoned.

[51] Int. Cl.² .............................................. B29H 5/02
[52] U.S. Cl. .................................... 156/110 R; 73/146;
[58] Field of Search ................ 73/146, 579, 646, 659; 152/209 R; 156/110 R

[56] References Cited

U.S. PATENT DOCUMENTS

| 1,956,011 | 4/1934 | Evans | 152/209 R |
| 2,006,197 | 6/1935 | Ewart et al. | 152/209 R |
| 2,808,867 | 10/1957 | Buddenhagen et al. | 152/209 R |
| 3,437,120 | 4/1969 | Verdier | 152/209 R |
| 3,926,238 | 12/1975 | Vorih | 152/209 R |

Primary Examiner—Anthony V. Ciarlante
Attorney, Agent, or Firm—Jack Posin

[57] ABSTRACT

A pneumatic tire having a tread design for reducing the amount of noise generated by the tire when rolled on a given surface, is disclosed. The tread comprises a plurality of circumferentially spaced lugs defining therebetween respective grooves, the lugs all being substantially similar to one another in configuration. Each of the lugs and its corresponding groove adjacent thereto in a given circumferential direction together defining a pitch of specified length which circumferentially is dimensionally identical to the pitch of certain others of the lugs and their corresponding grooves and is yet dimensionally different from the pitch of still others of the lugs and their corresponding grooves. The lugs are arranged such that certain (though not necessarily all) of the lugs and their corresponding grooves of the same pitch adjoin each other in succession in the form of a pitch-identifiable group differing in pitch from an adjoining pitch-identifiable group of still others of the lugs and their corresponding grooves. Such groups adjoin each other in a preferred circumferential series to define a pitch sequence which over its circumferential extent has excitation peak frequencies that do not coincide with the resonant frequencies of the tire.

2 Claims, 4 Drawing Figures

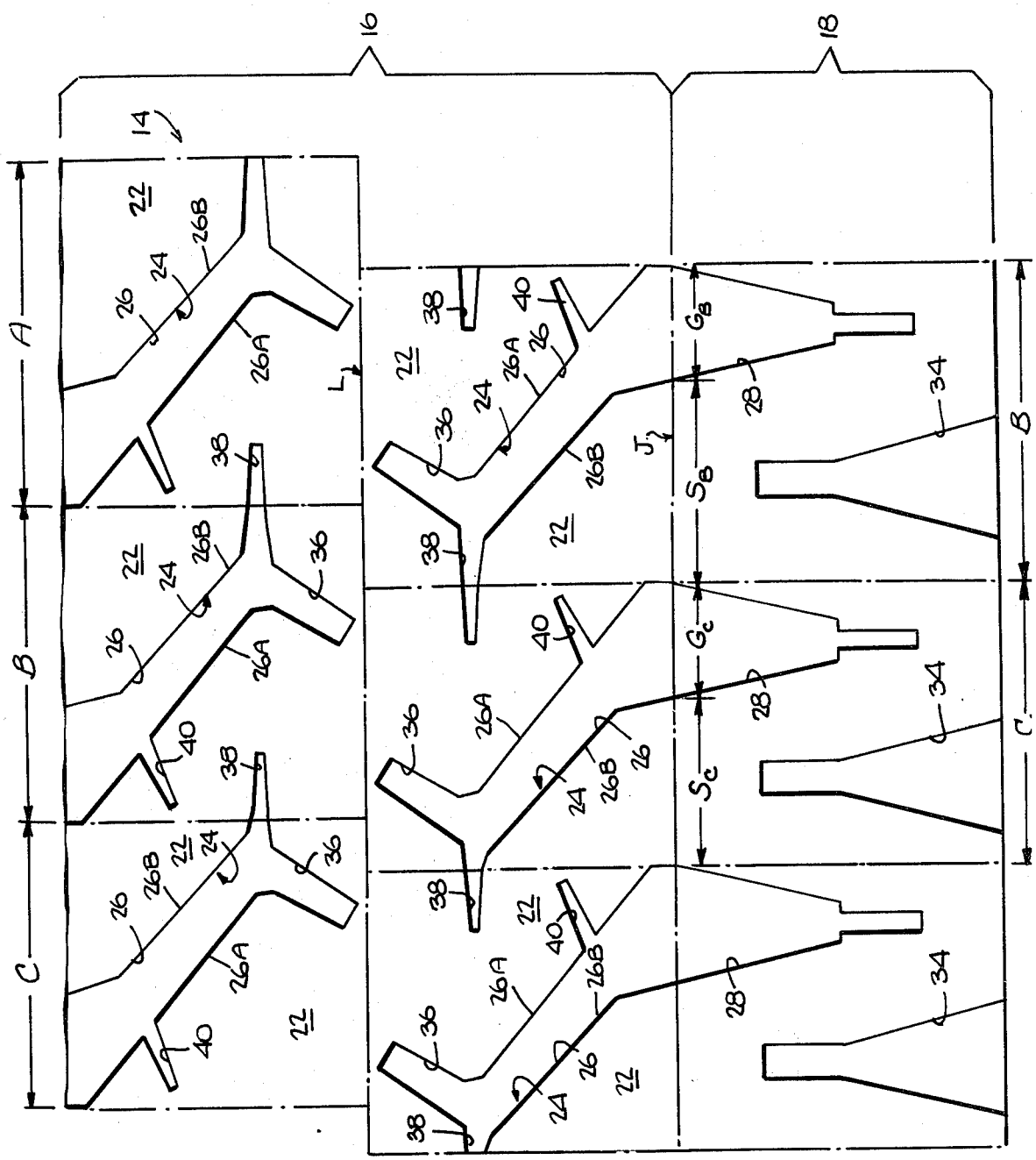

NOISE REDUCTION IN PNEUMATIC TIRES

This is a continuation, of application Ser. No. 839,235, filed Oct. 4, 1977, now abandoned which in turn is a continuation of application Ser. No. 673,313, filed Apr. 5, 1976, now abandoned.

The foregoing abstract is neither intended to define the invention disclosed in the specification, nor is it intended to limit the scope of the invention in any way.

BACKGROUND OF THE INVENTION

The present invention relates generally to pneumatic tires, and more particularly to pneumatic tires equipped with a specially designed tread to reduce the amount of noise generated by the tire as it rolls upon a given surface.

Among the many factors which relates to the generation of noise by pneumatic tires, there are four factors which are most paramount. These factors are (1) resonant lug vibration, (2) slip/stick vibration, (3) air pumping and (4) resonant reinforcement.

"Lug vibration" results from stressing the lugs in the contact patch (the footprint or interface between the road and the tread) in mutually perpendicular directions within the plane of the contact patch as well as in a direction normally of the contact patch. The fore and aft stresses of the lugs in the contact patch play the greatest roll in generating noise. As each lug leaves the contact patch, the stresses are suddenly relieved and the lug thereby "pops out" of the contact patch, undergoes severe vibrations and generates noise.

"Slip/stick vibration" occurs as various portions of the tread at least partially slide ("slip") over the road in different directions at various spots in the contact patch. In the course of such sliding, at one or more other spots in the contact patch the horizontal shear stresses are usually sufficiently low to allow interfacial (contact patch) friction to instantaneously "anchor" one or more portions (for example, one or more lugs) of the tread to the road at the spots of low stress level. Continued partial sliding of the tread, however, results in a build-up of stress in the "anchored" lugs which releases them from their anchored condition and causes them to undergo an instantaneous slip.

If the tire is one which is prone to permit the vibration of its lugs to resonate, the "slipping" and "sticking" of the tread lugs, when in synchronism with the vibratory resonances of the tire, are subject to reinforcement causing the lugs to undergo more severe vibrations and generate noise of increased intensity.

"Air pumping" is the action of forcing air in and out of the voids and sipes in and between the tread lugs. As a given void or sipe enters the contact patch, its volume is suddenly compressed thereby expelling or pumping air out. As each void or sipe leaves the contact patch, its volume suddenly expands, thereby pumping air back in. This rhythic pumping of air in and out of the voids or sipes generates continuous pressure waves or sound energy and, if excessive, noise.

"Resonant reinforcement" involves certain mass distributions and elastomeric properties of a tire which result in the vibration of parts of the tire that respond to vibration-inducing energy imparted to the tire in a repetitively timed sequence by reacting to create sharply increased vibrations at various speeds of the tire. If the tread lugs are spaced from one another such that their excitation peak frequencies coincide with the resonant frequencies of the tire, resonant reinforcement is said to occur with the result of sound build-up.

SUMMARY OF THE INVENTION

Accordingly, it is an object of the present invention to provide a tread design which takes into account the aforementioned four factors of noise generation (as well as others) in order to minimize the effect of each.

In order to minimize the extent of lug vibration, the tread of the present invention has been designed such that each presents an inclination (defined generally by the major void or groove between adjacent ones of the lugs) which forms an acute angle with the circumferential center-line of the tread. This is in accordance with a determination that lugs extending at an angle of substantially 90° relative to the circumferential centerline of the tread generate substantially more noise than lugs inclined at an acute angle relative to such centerline.

Moreover, in order to reduce lug vibration, the lugs have been designed to present a thickness of approximately two inches between the grooves which flank the respective lugs, it having been determined that lugs which are too thin (on the order, for example, of an inch and a half) or lugs which are too thick (on the order, for example, of in excess of three inches) generate greater noise than lugs which are approximately two inches in thickness.

The present invention also contemplates anchoring of each of the lugs of the tread to a central circumferential rib in order to reduce the flexibility of the lugs and, thereby, interfere with the slip/stick vibrations.

With respect to "resonant reinforcement", the tread of the present invention includes lugs which are generally similar to one another in configuration, each of the lugs and its corresponding groove adjacent thereto in a given circumferential direction together defining a pitch of specified length which circumferentially is dimensionally identical to the pitch of certain others of the lugs and their corresponding grooves and is yet dimensionally different from the pitch of still others of the lugs and their corresponding grooves.

The lugs and their corresponding grooves are circumferentially arranged such that certain (though not necessarily all) of the lugs and their corresponding grooves of the same pitch adjoin each other in succession in the form of a pitch-identifiable group differing in pitch from an adjoining pitch-identifiable group of still others of the lugs and their corresponding grooves. A selected arrangement of the groups which adjoin each other in circumferential succession define a pitch sequence which over its circumferential extent has excitation peak frequencies that do not coincide with the resonant fequencies of the tire.

The sound generated as a result of "air pumping" is reduced substantially by venting all of the sipes to a major void or groove which in turn itself is vented to the outside to prevent air entrapment.

BRIEF DESCRIPTION OF THE DRAWINGS

With the above and additional objects and advantages in view as will hereinafter appear, the instant invention comprises the devices, combinations and arrangements of parts hereinafter described and illustrated in the accompanying drawings of a preferred embodiment, in which:

FIG. 3 is a schematic plan developement of the lug pattern of the present invention, though not necessarily in a preferred sequence.

DETAILED DESCRIPTION OF THE INVENTION

Figure 1:
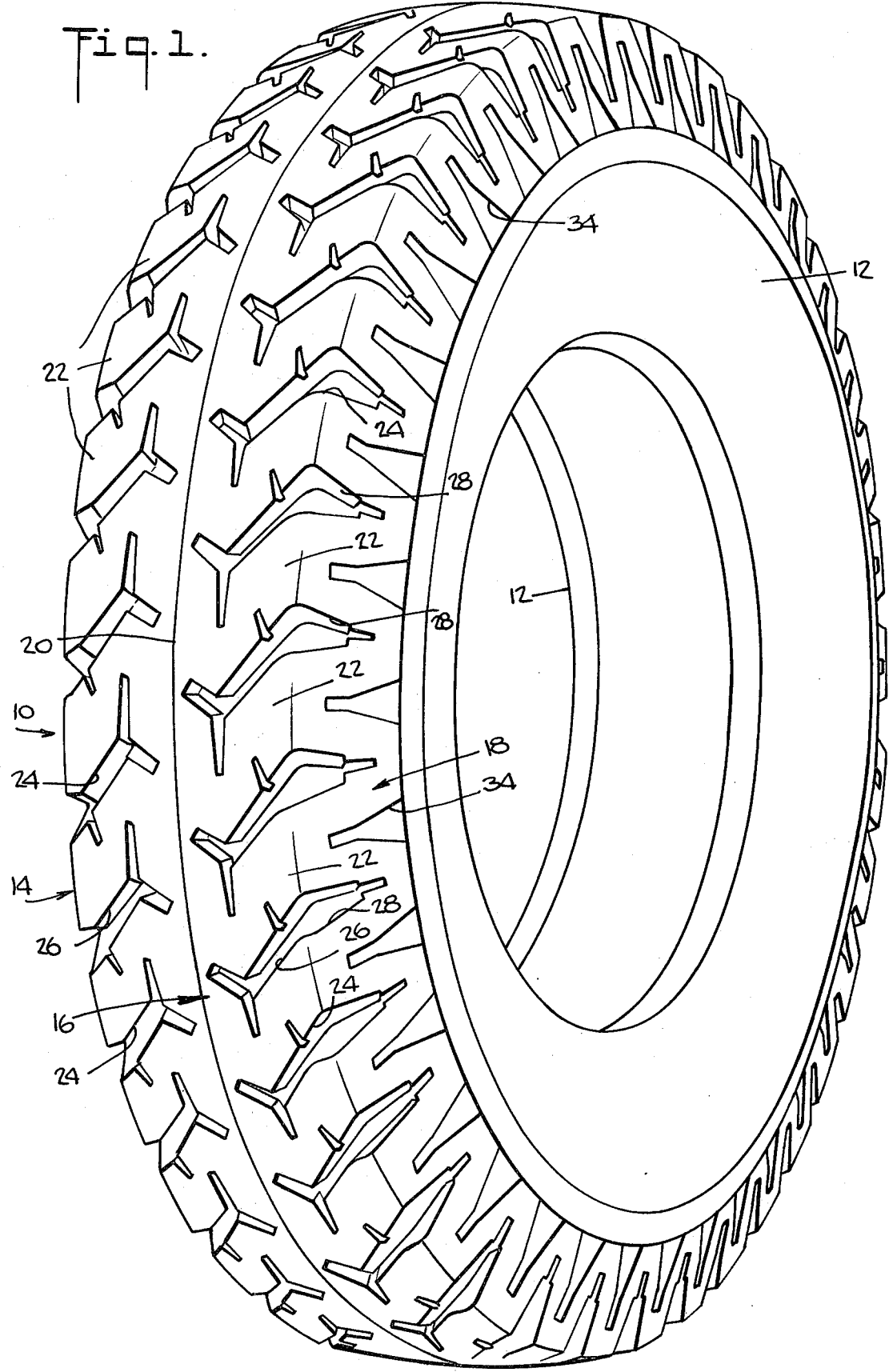
FIG. 1 is a perspective view of the pneumatic tire pursuant to the present invention.

Referring now to the drawings, and more particularly to FIG. 1, the present invention relates generally to a pneumatic tire denoted by the reference character 10. The tire 10 includes a pair of opposite bead-reinforced sidewalls 12 which are bridged by a circumferentially extending tread 14. The tread 14 includes what may be characterized as a road-contacting portion 16 and a pair of opposite non-road-contacting portions 18 (only one of which is shown) which annularly adjoin corresponding ones of the sidewalls 12.

The tread 14 is provided with a circumferentially extending rib 20 to which are anchored on either side thereof a plurality of tread lugs 22. The lugs 22 define therebetween respective grooves 24. Each of the grooves 24 has a first extent 26 which is inclined with respect to the rib 20, and a second extent 28 formed in the non-road-contacting portion 18 of the tread 14 and which extends beyond the depth of its corresponding first extent 26 formed in the road-contacting portion 16 of the tread 14. Each of the aforementioned second extends 28 of the grooves 24 is directed generally radially of the tire 10 and closes proximate to its corresponding one of the sidewalls 12.

Figure 2:
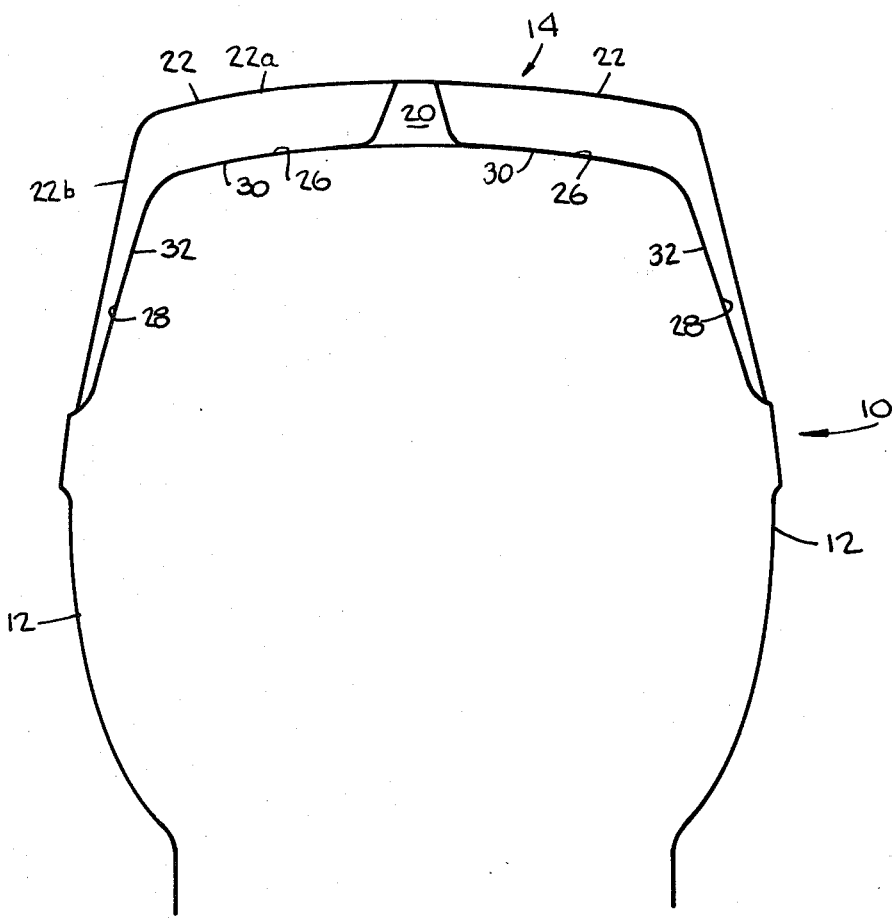
FIG. 2 is a schematic view illustrating the general deckline profile of the major grooves in the tread of the present invention.

As illustrated in FIG. 2, the first extent 26 of each of the grooves 24, over the majority of its length, has a substantially uniform depth, whereas each of the aforementioned second extents 28 of each of the grooves 24 has a varying depth which decreases in the aforementioned second extents 28 in the direction toward its corresponding one of the sidewalls 12. Accordingly, each of the grooves 24 has a deckline profile defined by the inner but exposed surface 30 of each of the aforementioned first extents 26 and by the inner but exposed surface 32 of each of the aforementioned second extents 28. Pursuant to the present invention, the inner but exposed surfaces 30 and 32 merge with each other at a radius of curvature in excess of the radius of curvature with which the outermost surfaces 22a and 22b of each of the lugs adjoin each other.

As illustrated in FIG. 1, each of the lugs 22 in the non-road-contacting portions 18 is formed with a substantially V-shaped cut-out 34 to reduce the amount of tread stock used in the tire 10 and to enhance slightly the degree of flexibility of each of the lugs 22 at the sidewalls 12.

Referring now to FIG. 3, there is schematically illustrated a plan development of a portion of the tread 14 to show the relationship of the lugs 22 and the grooves 24 defined therebetween with one another. It will be understood, however, that the illustrated juxtaposition of certain of the lugs 22 with one another may not necessarily be preferred. The preferred juxtaposition of the lugs 22 with one another will, however, be discussed below.

Each of the lugs 22 is substantially identical to one another in configuration though, as well be discussed below, their relative sizes may be different. Each of the grooves 24 is provided with three sipes; namely, a first sipe 36 which is inclined with respect to the circumferential center-line L of the tread 14, a second sipe 38 which extends substantially parallel to the circumferential center-line L, and a third sipe 40 which is inclined only slightly with respect to the circumferential center-line L.

Moreover, the aforementioned first extent 26 of the grooves 24 is provided with a first wall 26a which is inclined, preferably, with respect to the circumferential center-line L at approximately 40°, and a second wall 26b which is inclined with respect to the circumferential center-line L at approximately 43°. Thus, each of the lugs 22 may be said to be inclined with respect to the circumferential center-line L or the rib 20 at approximately 40°–43°. As illustrated, each of the sipes 36, 38 and 40 opens into its corresponding one of its grooves 24 and may, thus, be characterized as "vented" sipes.

Preferably, the lugs 22 are arranged on either side of the circumferential center-line L as two arrays, the lugs 22 of one of the arrays on one side of the rib 20 having an orientation relative to rib 20 which is opposite of, and out of phase with (or staggered relative to), the orientation of the lugs 22 of the other of the arrays on the other side of the rib 20. Moreover, at a juncture J between the road-contacting portion 16 of the tread 14 and the non-road-contacting portion 18 of the tread 14, each of the lugs 22 has a circumferential span S of approximately two inches.

However, as will be seen below, certain of the lugs 22 have a circumferential span S which may be slightly greater or less than two inches, this difference in circumferential span of the lugs 22 at the juncture J being the principal basis for the difference in size of the lugs 22. The difference in size of the lugs 22 and the relative juxtaposition of the differently sized lugs 22, in combination with certain of the structural relationships aforementioned, give rise to a tread pattern of lugs which prevents the resonance of sound that may be otherwise generated by the tire when the latter is put into vehicular use and rolled on a surface, for example, in a range encompassing approximately fifty miles per hour.

With respect to "resonant reinforcement", in order to appreciate the manner by which the present invention achieves its objective to diminish the amount of noise generated by a rolling tire, certain terms will now be defined. Each of the lugs 22 is associated with a corresponding (adjacent) one of the grooves 24 in a given circumferential direction. The circumferential span S of a lug 22 when added to the circumferential span G of its adjacent corresponding groove 24, at the juncture J between the road-contacting portion 16 and the non-road-contacting portion 18, gives rise to the term "pitch" having units of length.

It will be understood, that for purposes herein the term "pitch" refers to a circumferentially extending dimension of a portion of the tread 14, and does not refer to a parameter or characteristic of sound. Thus, as illustrated in FIG. 3, the combined extends $S_B + G_B$ result in a specified pitch, for example, the pitch B. Similarly, the circumferential span $S_C$ when added to circumferential span $G_C$ gives rise to the pitch C. The same is true with respect to the pitch A.

Figure 4:
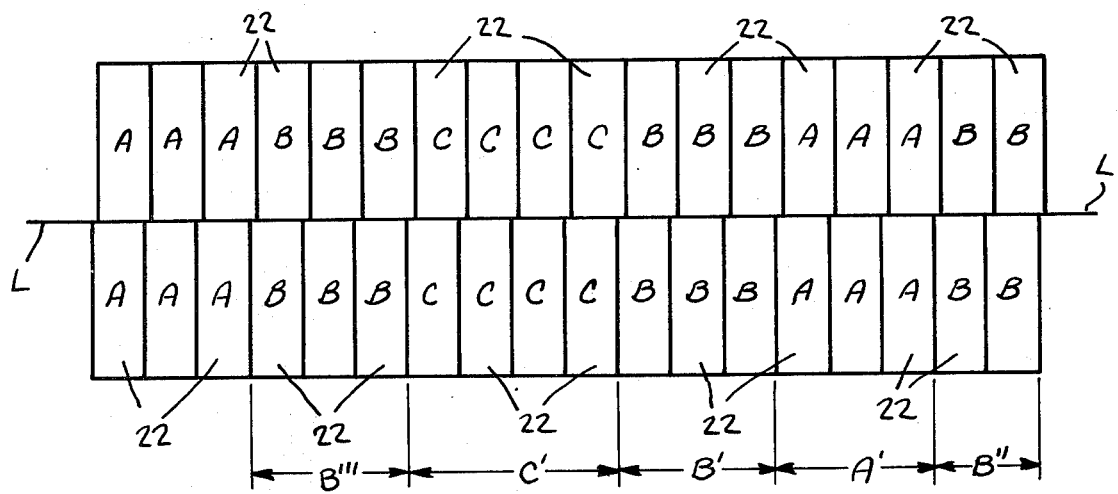
FIG. 4 is a schematic representation of the preferred "pitch sequence" of the present invention.

As illustrated in FIG. 4, the lugs 22 (with their corresponding grooves) of the present invention are divided, for example, into three catagories each of the categories being defined by a specified pitch; namely, the pitch A, the pitch B and the pitch C. Not all of the lugs 22 of the same category or pitch are juxtaposed adjacent to one another in series. Only a certain predetermined number of the lugs 22 of the same pitch are juxtaposed adjacent to one another, for example, two, three or four of such lugs 22. Each group of lugs 22 of the same pitch which are adjacent to one another is characterized herein as a "pitch-identifiable group (identifiable by pitch and not necessarily by the number of the lugs 22 of a particular group).

Pursuant to the present invention, each pitch-identifiable group separates two other pitch-identifiable groups whose respective pitches differ from the group separating them but may or may not differ from each other. For example, as illustrated in FIG. 4, there exists a pitch-identifiable group denoted by the reference character A', each of the lugs of which (with its corresponding groove) has a pitch A. To the left of the group A', there exists a group of three lugs 22 each (with its corresponding groove) having a respective pitch B, that group being denoted by reference character B'. Similarly, to the right of the group A', there exists a group of two lugs 22 each (with its corresponding groove) having a respective pitch B, that group being denoted by the reference character B''. Thus, in this instance, the pitch-identifiable group A' separates the two groups B' and B'' having the same pitch but different numbers of lugs. A similar situation exists with respect to the group C' which separates the group B' of three lugs aforementioned (on the right of the group C') from another group B''' (on the left of the group C'). It will be seen that the groups B', B'' and B''' are each comprised of lugs having the same pitch B.

A different situation exists with respect to the group B' of three lugs aforementioned which separates the aforementioned group A' (whose lugs have a pitch of A) from the group C' aforementioned (whose lugs have a pitch of C).

It is the relative juxtaposition of the various groups A', B' and C' in series or circumferential succession that gives rise to what is characterized herein as a "pitch sequence". The pitch sequence of pitch-identifiable groups is designed so that the resonant frequencies of the tire are not excited in a timed, repetitively coinciding, vibratory sequence when the tire is rolled on a surface. In other words, the lugs of the tread design of the present invention are arranged so that their peak excitation frequencies do not coincide repetitively with the resonant frequencies of the tire. As a result, the vibrations of the lugs do not reinforce one another or other means of tire vibration, and are allowed to be dissipated without generating excessive sound.

What must be emphasized with respect to the pitch sequence of the present invention is that it is not a randomly or arbitrarily selected pattern. It is an empirically determined arrangement established as a result of evaluating the physical characteristics of a particular type of lug pattern of a particular type of tread and predetermining the various resonant frequencies of that lug pattern which must not be excited at various speeds of the tire.

For example, each type of tire, like any article capable of vibrating, has one or more resonant frequencies. The various resonant frequencies can be determined by rolling the tire at various speeds to excite the tire into vibrating at its different resonant frequencies. By gradually increasing the rolling speed of a test specimen tire having a design wherein the lugs are of the same size and equidistantly spaced from each other, the sound level gradually increases. However, at certain speeds of the specimen tire, the sound level (usually measured in decibels) suddenly rises rapidly and graphically peaks. The frequency of each "peak" sound in such a tire occurs at a different resonant frequency of the tire. Each "peak" (or resonant) frequency is easily determinable by conventional audio equipment.

All of the so-called "peak" or resonant frequencies of the specimen tire over a preferred range of speeds that the tire is expected to be used can be similarly determined. A graph can then be established in which sound intensity, in decibels, is plotted along the vertical axis and sound frequency, in cycles per second, is plotted along the horizontal axis. The resultant curve will present various peaks which, in this instance, constitute the resonant frequencies of the specimen tire. It is these resonant frequencies that must not be overly excited by a lug pattern of a tire that is to radiate a low level of noise and is one similar to the one from which the aforementioned graph is derived, but altered slightly with respect to the distance between, or pitch of, the lugs of the lug pattern.

In this respect, a first modified lug pattern design can be selected (for example, arbitrarily, without building same) such that the spacing between the lugs is altered from the aforementioned specimen tire. Such alteration involves a slight change in pitch between adjacent ones of the lugs such that the leading edges of the lugs are not equidistantly spaced uniformly over the circumference of the tread. It will be understood, that the resonant frequencies of the aforementioned specimen tire are substantially the same as the resonant frequencies of the first modified lug pattern design because of the only slight alteration in pitch of the modified lug pattern design from the specimen tire.

With a first modified lug pattern design as so selected (not built), one can "calculate" a graphic spectrum of excitation frequencies that would occur over a preferred range of speeds that a tire encompassing such a pattern would be expected to be used. Because of the lack of uniformity in the modified lug pattern design, the various calculated peaks presented by the graphic spectrum of excitation frequencies are not necessarily the various resonant frequencies of such a tread design. However, such various "calculated" peaks can be used as a basis of comparison with the "empirically determined" peak (and, in fact, the resonant) frequencies of the aforementioned specimen tire appearing in the aforementioned graph derived from the specimen tire. If the "calculated" peaks coincide with the "empirically determined" peaks, such a modified lug pattern design would generate an unacceptable high level of noise. If the "calculated" peaks do not coincide with the "empirically determined" peaks, such a modified lug pattern design would generate only a low, and thus tolerable, level of noise. In such instance, it is said that the excitation peak frequencies of a tire having the modified lug pattern design do not coincide with the resonant frequencies of such a tire. Such a tire is, therefore, a quieter riding tire.

It will be understood that second and still other modified lug pattern designs may have to be selected and evaluated in order to maximize the number of excitation peak frequency locations that do not coincide with the resonant frequency locations of each such design. By effecting "non-coincidence" at certain locations, other locations originally non-coincident may be caused to become coincident. Each such cause-and-effect must be accounted for before achieving the most desirable quiet-riding tread pattern design.

The procedure by which the graphic spectrum of excitation frequencies is calculated is a standard Fourier Harmonic Analysis in which each leading edge of each lug is characterized as producing a unit pulse of excitation, and in which the timing of repetition of the pulses of excitation is equal to the repetitive distances between the leading edges divided by the rotary speed of the tire. Such an analysis is described in a text entitled "Mathematical Handbook for Scientists and Engineers" published by McGraw-Hill (1961) and authored by Korn and Korn. Section 4.11-4 particularly involves "Fourier Analysis (Harmonic Analysis) of Periodic Functions".

It is by the above process that the pitch sequence of the present invention is determined. With the test information so established, the lugs 22 can be sized with selected circumferential dimensions (pitch) and arranged in selected groups. The groups can then be arranged in a preferred series or pitch sequence which most effectively allows the vibrations to dissipate without reinforcing one another.

With respect to a preferred embodiment of the present invention, the tire 10 of the present invention may be one which, for example presents a bead diameter of substantially twenty-two inches and a maximum inflated width, from sidewall-to-sidewall, of approximately ten inches. With such dimensions, it has been determined that the tread of the tire 10 preferably include substantially thirty-six lugs in circumferential succession on each side of the central rib 20. As such, those lugs 22 having a pitch A have a circumferential span of, for example, 4.08 inches, whereas the lugs 22 having a pitch B have a circumferential span of, for example, 3.71 inches, and whereas the lugs 22 having a pitch C have circumferential span of, for example, 3.34 inches. The lugs 22 having a pitch A are twelve in number, whereas the lugs 22 having a pitch B are sixteen in number, and whereas the lugs 22 having a pitch C are eight in number.

Generally, it is preferred that the lugs 22 having a pitch C be approximately 90% (plus or minus 2½%) of the circumferential span of the lugs 22 having a pitch B. Similarly, it is preferred that the lugs 22 having a pitch A be approximately 110% (plus or minus 2½%) of the circumferential span of the lugs 22 having a pitch B. The preferred pitch sequence (as illustrated in FIG. 4) of such a tire has been determined to be:

A-A-A-B-B-B-C-C-C-B-B-B-A-A-A-B-B

This pitch sequence involves the use of eighteen of the lugs 22 and, thus, at least insofar as the tire 10 of the dimensions aforementioned is concerned, the aforementioned pitch sequence is repeated a second time.

This pitch sequence represents the preferred sequence for a tire of the aforementioned dimensions which has excitation peak frequencies that do not coincide with the resonant frequencies thereof. It is just such a pitch sequence that, although alone will substantially reduce tread noise, will also, in combination with (a) the deckline profile of the vented grooves 24, and (b) the inclination of the extent 26 of each of the grooves 24 with respect to the central rib 20, and (c) the anchoring of tread lugs of approximately two inches in circumferential span to a central rib, optimize a reduction in lug vibrations, slip/stick vibrations and air pumping and, thereby, optimize a reduction in the amount of noise generated by the tire when it is rolled on a surface.

In short, when a conventional tire is rolled on a given surface, for example, in a range encompassing approximately fifty miles per hour, as each tread element snaps circumferentially when exiting from the contact patch, it creates an impulse of vibration. When the timing of these impulses are such as to coincide with the timing of the resonances of the tire, large resonant vibrations are induced, and this in turn causes large amounts of noise. In addition, the large levels of resonant vibrations then promote slip/stick vibrations at the same frequency, which slip/stick vibrations themselves create vibratory impulses which assist in maintaining the large resonant vibrations.

However, when the spacing and timing of the pitch sequence is properly irregular (as is so in the present invention), the impulses of snapping due to the tread lugs both partially reinforce and partially interfere with the resonant vibrations of the tire. The net result is primarily a diminished degree of resonant vibrations. Correspondingly, there is secondarily effected a reduction in the amount of slip/stick excitation resonances of the tire and, therefore, there is a double basis for a reduced level of noise that accrues just from the pitch sequence of the present invention. The other design features of the tire of the present invention complement the pitch sequence in still further reducing noise generation.

It will be understood that the foregoing description of a preferred embodiment of the present invention is for purposes of illustration only and the various structural and operational features and relationships herein disclosed are susceptible to a number of modifications and changes none of which entails any departure from the spirit and scope of the present invention as defined in the hereto appended claims.

What is claimed is:

1. A method of making a pneumatic tire to minimize noise generated by such tire during operation in a preferred speed range comprising the steps of:
   (a) determining the resonant frequencies of a specimen tire;
   (b) determining, for a plurality of tread pitch sequences, each of which includes a plurality of lugs, the excitation peak frequencies of each such tread pitch sequence, the excitation peak frequencies of each such tread pitch sequence being the frequencies of the strongest excitations which that tread pitch sequence would create upon operation of a tire in the preferred speed range with that tread pitch sequence applied thereto;
   (c) comparing the excitation peak frequencies of each such tread pitch sequence with the resonant frequencies of the specimen tire, to determine the degree of coincidence between the excitation peak frequencies of each such tread pitch sequence and the resonant frequencies of the specimen tire;
   (d) selecting the tread pitch sequence for which said degree of coincidence is the lowest; and
   (e) applying the tread pitch sequence so selected to the tire being made.

2. A method as claimed in claim 1, wherein the resonant frequencies of the specimen tire are determined by constructing a specimen tire having a tread pitch sequence including a plurality of lugs of equal size spaced uniformly from one another, rolling the specimen tire at various speeds to excite the tire at various frequencies, and measuring the level of sound generated by the tire during its excitation at each such frequency, the resonant frequencies of the tire corresponding to the frequencies at which the level of sound generated by the specimen tire during the rolling step is greatest.

* * * * *